United States Patent
Rizkallah et al.

(10) Patent No.: US 10,535,040 B2
(45) Date of Patent: Jan. 14, 2020

(54) PRODUCT MOVEMENT AND DISTRIBUTION SYSTEMS AND METHODS

(71) Applicant: Walmart Apollo, LLC, Bentonville, AR (US)

(72) Inventors: Andrew J. Rizkallah, Bentonville, AR (US); Thomas E. Lazzaro, Belmont, NC (US); Justin P. Dillane, Lake Monticello, VA (US)

(73) Assignee: Walmart Apollo, LLC, Bentonville, AR (US)

(*) Notice: Subject to any disclaimer, the term of this patent is extended or adjusted under 35 U.S.C. 154(b) by 357 days.

(21) Appl. No.: 15/471,297

(22) Filed: Mar. 28, 2017

(65) Prior Publication Data
US 2017/0286907 A1    Oct. 5, 2017

Related U.S. Application Data

(60) Provisional application No. 62/316,717, filed on Apr. 1, 2016.

(51) Int. Cl.
G06F 7/00 (2006.01)
G06Q 10/08 (2012.01)
G06Q 30/06 (2012.01)

(52) U.S. Cl.
CPC ....... *G06Q 10/0875* (2013.01); *G06Q 10/083* (2013.01); *G06Q 30/0635* (2013.01)

(58) Field of Classification Search
None
See application file for complete search history.

(56) References Cited

U.S. PATENT DOCUMENTS 7,266,422 B1    9/2007 DeMotte
9,315,344 B1 *  4/2016 Lehmann ............... G06Q 10/08
(Continued)

FOREIGN PATENT DOCUMENTS

WO    1993001979    2/1993
WO    2005080239    9/2005
WO    2008067516    6/2008

OTHER PUBLICATIONS

Cuauhtli-Ollin Treviño Martinez, Samuel; "An Integrated Stock Assignment Model for a Warehouse Fast Picking Area"; A Thesis Presented to the Faculty of the Graduate School at the University of Missouri-Columbia; Presented Dec. 2008; Retrieved on Jan. 5, 2016; 103 pages.

(Continued)

*Primary Examiner* — Yolanda R Cumbess
(74) *Attorney, Agent, or Firm* — Fitch, Even, Tabin & Flannery LLP (57) ABSTRACT

Some embodiments provide systems, apparatuses, and methods to direct the consolidation of products in fulfilling a product order for a retail shopping facility. In some embodiments, a system is configured to identify a shipment order for products to be delivered to a shopping facility and that includes a request for a full pull pallet of a first product and additional products; define the full pull pallet as an enhanced case intended to be treated by an orderfiller worker as less than a full pull pallet; generate a pallet assembly list identifying the enhanced case and the items of a plurality of the additional products; and communicate the pallet assembly list to a user interface unit to be accessible by an orderfiller worker and directing the orderfiller worker to retrieve and cooperate the enhanced case and the additional products as an assembled pallet.

20 Claims, 3 Drawing Sheets

(56) References Cited

U.S. PATENT DOCUMENTS

| | | | |
|---|---|---|---|
| 2004/0165980 A1 | 8/2004 | Huang | |
| 2004/0223839 A1 | 11/2004 | Simkowski | |
| 2006/0235769 A1 | 10/2006 | Cheng | |
| 2008/0008573 A1 | 1/2008 | Mitchell | |
| 2008/0131255 A1* | 6/2008 | Hessler | B65B 35/50 414/788.1 |
| 2013/0342353 A1* | 12/2013 | Choi | G06K 7/10366 340/686.1 |
| 2015/0073588 A1 | 3/2015 | Priebe | |

OTHER PUBLICATIONS

Fedex; "Packing Guidelines for Shipping Freight"; Retrieved on Jan. 5, 2016 pp. 1-17.

Lowe'S Companies, Inc.; "Palletization and Shipping Guidelines for Domestic Distribution (regional Distribution Center and Store Direct Shipments)"; Retrieved on Jan. 5, 2016; 23 pages.

PCT; App. No. PCT/US2017/024237; International Search Report and Written Opinion dated Jun. 21, 2017.

* cited by examiner

PRODUCT MOVEMENT AND DISTRIBUTION SYSTEMS AND METHODS

CROSS-REFERENCE TO RELATED APPLICATION

This application claims the benefit of U.S. Provisional Application No. 62/316,717, filed Apr. 1, 2016, which is incorporated herein by reference in its entirety.

TECHNICAL FIELD

This invention relates generally to systems to move and distribute products.

BACKGROUND

In a modern retail environment, there is a need to improve the customer service and/or convenience for the customer. One aspect of customer service is having products on-hand at the retail shopping facilities. Often products are distributed to retail shopping facilities through product distribution and/or fulfillment centers. Orders from products to be shipped to different shopping facilities can be fulfilled at a fulfillment center.

BRIEF DESCRIPTION OF THE DRAWINGS

Disclosed herein are embodiments of systems, apparatuses and methods pertaining to the movement and/or distribution of products. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to identify and cooperate products within a product fulfillment center and/or other facilities to distribute products to retail shopping facilities. Typically, a product fulfillment center temporarily houses relatively large quantities of products that are to be distributed from the product fulfillment center to multiple retail shopping facilities so that the products can be displayed and sold from to customers from the retail shopping facilities. Retail shopping facilities submit orders for one or more products to the product fulfillment center and/or a central ordering system that directs the order to an appropriate one or more product fulfillment centers. Some embodiments comprise a system to direct the consolidation of products in fulfilling a product order for a retail shopping facility. The system includes an order fill management system associated with the product fulfillment center, and a plurality of mobile user interface units (e.g., smart phones, tablets, facility supplied devices, or other such devices). These user interface units include wireless transceivers, a control circuit, and a user interface. The order fill management system typically includes a transceiver, a management control circuit and memory storing computer instructions that when executed by the management control circuit cause the management control circuit to identify at least one shipment order for multiple different products intended to be delivered to a retail shopping facility to be displayed and sold at the retail shopping facility. In some implementations, the shipment order may include a request for at least a full pull pallet of a first product, and often includes requests for items of multiple additional products wherein the number of items of each of the multiple additional products ordered is less than a full pull pallet of that product.

The system defines the full pull pallet of the first product as an enhanced case of the first product such that the enhanced case is intended to be treated by an orderfiller worker, when collecting products to fulfill the shipment order, as less than a full pull pallet. A pallet assembly list is generated that identifies the enhanced case of the first product and the items of at least a plurality of the multiple additional products. The pallet assembly list can then be communicated to a first user interface unit associated with an orderfiller worker to be accessible by the orderfiller worker. The pallet assembly list or other instruction can further direct the orderfiller worker to travel through at least part of the fulfillment center to retrieve and cooperate the enhanced case of the first product and the plurality of the multiple additional products as a single assembled pallet.

Figure 1:
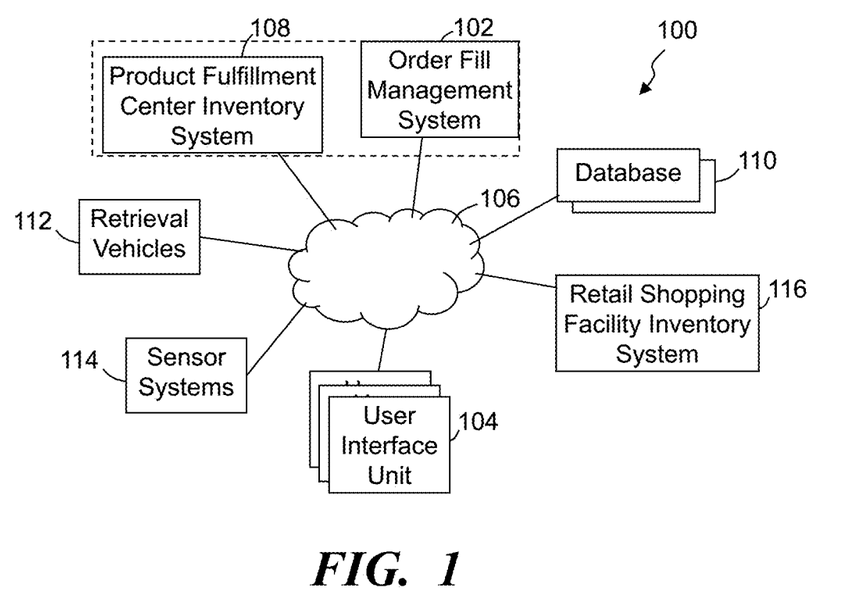
FIG. 1 illustrates a simplified block diagram of an exemplary a product fulfillment system, in accordance with some embodiments.

FIG. 1 illustrates a simplified block diagram of an exemplary a product fulfillment system 100, in accordance with some embodiments. The product fulfillment system 100, in some applications, includes one or more order fill management systems 102 and multiple user interface units 104 in communication over one or more distributed computer and/or communication networks 106. In some implementations, the order fill management system includes or is in communication with a product fulfillment center inventory system 108 that tracks inventory and the movement of inventory in and out of the product fulfillment center. In some applications, the order fill management system and/or the product fulfillment center inventory system 108 can be implemented local at the product fulfillment center, while in other implementations the order fill management system and/or the product fulfillment center inventory system 108 may be implemented through multiple processing systems distributed over the computer network. Further, the order fill management system and/or the product fulfillment center inventory system 108, in some embodiments, may provide management and track product inventory over multiple different product fulfillment centers.

The product fulfillment system typically further includes and/or accesses over the communication network one or more databases 110. The databases can store information about products, inventory information, shipping schedules, product orders from retail shopping facilities, other such information, and typically a combination of two or more of such information. In some embodiments, the product fulfillment system may further include and/or communicate with retrieval vehicles 112 that are configured to be used by order filler workers to travel through the product fulfillment center and retrieve products for fulfilling part or all of one or more orders from one or more retail shopping facilities that are to be shipped out to the retail shopping facilities. Some embodiments further include sensor systems 114. The sensor systems can include one or more types of sensor systems to be utilized at a product fulfillment center. In some implementations, one or more sensor systems are utilized to track the movement of user interface units 104, retrieval vehicles, products, shipping vehicles, other things at the product fulfillment center, or a combination of two or more of such things. The sensor systems 114 can further determine weights (e.g., weights of full pallets, products, assembled pallets, shipping containers, shipping vehicles, truck trailers, and the like), identify products and/or pallets (e.g., radio frequency identifier (RFID) readers and/or systems, optical code readers (e.g., bar code readers, matrix barcode readers, etc.), text capture systems, image capturing systems, image and/or vide processing systems, and other such systems.

Further, in some instances, the order fill management system is in communication with multiple retail shopping facility inventory systems 116 and/or product order systems to receive product orders that are to be fulfilled through the product fulfillment center. Additionally or alternatively, the order fill management system may be in communication with a central order distribution system that centrally receives product orders from multiple different retail shopping facilities, and distributes the product orders and/or parts of product orders to one or more product fulfillment centers based on one or more criteria (e.g., inventory at the product fulfillment center, distance between product fulfillment centers and requesting retail shopping facilities, available shipping vehicles, priority of an order, other such criteria, or a combination of two or more of such criteria).

Figure 2:
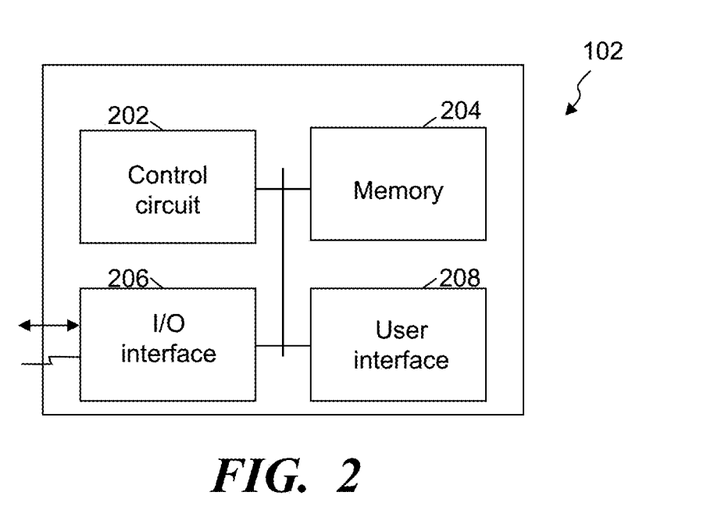
FIG. 2 illustrates a simplified block diagram of an exemplary order fill management system, in accordance with some embodiments.

FIG. 2 illustrates a simplified block diagram of an exemplary order fill management system 102, in accordance with some embodiments. The order fill management system 102 includes one or more management control circuits 202, memory 204, and input/output (I/O) interfaces and/or devices 206. Some embodiments further include one or more user interfaces 208. The control circuit 202 typically comprises one or more processors and/or microprocessors. The memory 204 stores the operational code or set of instructions that is executed by the control circuit 202 and/or processor to implement the functionality of the order fill management system 102. In some embodiments, the memory 204 may also store some or all of particular data that may be used to identify products, identify product locations, select products to be collected, select a filler worker, obtain and/or determine routing, obtain and/or generate a pallet assembly list, obtain and/or generate product stacking instructions, obtain and/or generate graphical imagery and/or orientation information for such graphical imagery, and/or make other associations, determinations, measurements and/or communications described herein. Such data may be pre-stored in the memory 204, received from an external source, be determined, and/or communicated to the order fill management system.

It is understood that the control circuit 202 and/or processor may be implemented as one or more processor devices as are well known in the art. Further, in some instances, the control circuit 202 may be implemented through multiple processors distributed over one or more computer networks. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 204 is shown as internal to the order fill management system 102, the memory 204 can be internal, external or a combination of internal and external memory. While FIG. 2 illustrates the various components being coupled together via a bus, it is understood that the various components may actually be coupled to the control circuit 202 and/or one or more other components directly.

Further, the control circuit 202 and/or electronic components of the order fill management system 102 can comprise fixed-purpose hard-wired platforms or can comprise a partially or wholly programmable platform. These architectural options are well known and understood in the art and require no further description here. The order fill management system and/or control circuit 202 can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the order fill management system 102 to external components, such as the user interface units 104, databases 110, product fulfillment center inventory system 108, retrieval vehicles 112, sensor systems 114, retail shopping facility inventory systems 116, and other such devices or systems. Typically, the I/O interface 206 provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the order fill management system includes one or more user interfaces 208 that may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to product orders, product information, shipping information, product location information, worker information, worker location information, user interface unit location information, vehicle information, vehicle location information, image content, scans, sensor data, status information, communication information (e.g., text messages, emails, etc.), mapping information, operating status information, notifications, errors, conditions, and/or other such information. Similarly, the user interface 208 in some embodiments may include audio systems that can receive audio commands or requests verbally issued by a worker, and/or output audio content, alerts and the like.

Figure 3:
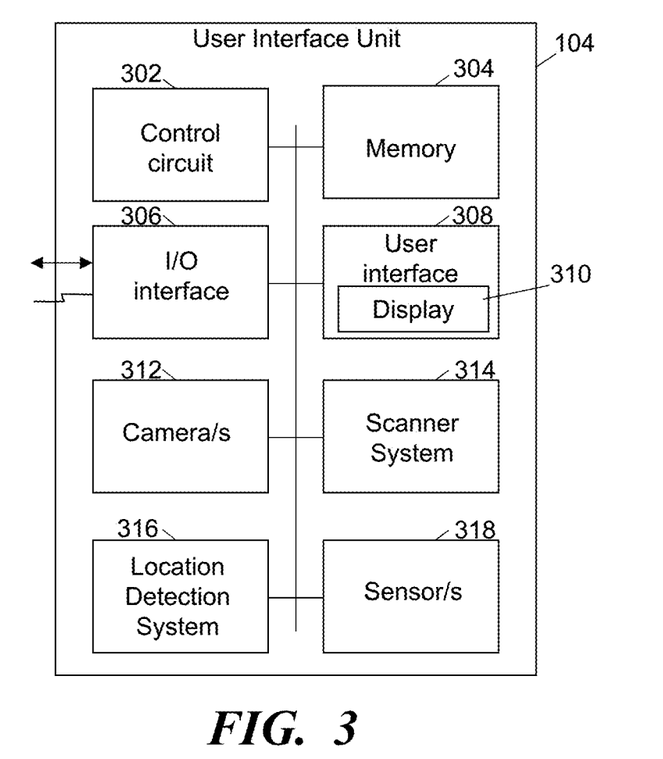
FIG. 3 illustrates a simplified block diagram of an exemplary user interface unit (UIU), in accordance with some embodiments.

FIG. 3 illustrates a simplified block diagram of an exemplary user interface unit (UIU) 104, in accordance with some embodiments. The user interface unit includes one or more control circuits 302, memory 304, input/output (I/O) interfaces and/or devices 306, and user interfaces 308. In some implementations, the user interface unit further includes one or more cameras 312. Additionally, in some applications, the user interface unit may include one or more scanner systems 314 and/or code readers, location detection systems 316, sensors 318, and/or other such systems.

The control circuit 302 typically comprises one or more processors and/or microprocessors. In some embodiments, the control circuit may include and/or couple with one or more graphics processors configured to generate and/or display graphical representations of the product packages. The memory 304 stores the operational code or set of instructions that is executed by the control circuit 302 and/or processor to implement the functionality of the user interface unit 104. In some embodiments, the memory 304 may also store some or all of particular data that may be needed to provide product collection instructions, display images of products, display orientation information, enable communication with the order fill management system, databases and/or other systems, capture images and/or video, and make any of the associations, determinations, measurements and/or communications described herein. Such data may be pre-stored in the memory, received from an external source, be determined, and/or communicated to the user interface unit. It is understood that the control circuit 302 and/or processor may be implemented as one or more processor devices as are well known in the art.

Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the user interface unit 104; however, the memory 304 can be internal, external or a combination of internal and external memory. Additionally, the user interface unit typically includes a power supply (not shown) that is typically rechargeable, and/or it may receive power from an external source. While FIG. 3 illustrates the various components being coupled together via a bus, it is understood that the various components may actually be coupled to the control circuit 302 and/or one or more other components directly.

Generally, the control circuit 302 and/or electronic components of the user interface unit 104 can comprise fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the user interface unit 104 to external components. Typically, the I/O interface 306 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 308 may be used for user input and/or output display. For example, the user interface 308 may include any known input devices, such one or more buttons, knobs, selectors, switches, keys, touch input surfaces, audio input, and/or displays, etc. Additionally, the user interface 308 include one or more output display devices, such as lights, visual indicators, display screens 310, etc. to convey information to a user, such as but not limited to products to be collected, locations of products within the fulfillment center, routing information through the fulfillment center, product identifying information, images of one or more products, images of a full pull pallet of a product, product placement and/or orientation information, consolidation and/or arrangement instructions, the 3D graphical representation of the products and their orientation, information, dimensions, product priorities, identifier information, temperature requirements, communication information (e.g., text messages, emails, etc.), status information, mapping information, operating status information, notifications, errors, conditions, and/or other such information. Similarly, the user interface 308 in some embodiments may include audio systems that can receive audio commands or requests verbally issued by a worker, and/or output audio content, alerts and the like.

The one or more cameras 312 may be included to capture images and/or video. In operation, a worker can orient the user interface unit with a camera and activate the camera to capture one or more images and/or video. In some embodiments, the user interface unit 104 may include one or more scanner systems 314 configured to detect and/or read machine readable codes on product packaging, retrieval vehicles, delivery vehicles, and the like. The scanner systems 314 can be substantially any relevant system capable of scanning a machine readable code, detecting a machine readable code, capturing an image of an identifier and obtaining product identifier information based on the identifier in the image, and other such scanning systems. For example, the scanner system may be an optical bar code reader that obtains an identifier from a bar code and determine and identifier of the product, a camera that captures an image of a 2-dimensional code, and the like. The scanner system 314 can be configured to extract code information from the one or more machine readable codes that are read and/or detected, and/or the control circuit 302 may extract identifying information. Alternatively or additionally, the code information may be communicated to the order fill management system or other source that can extract and/or determine relevant identifier information.

In some embodiments, the user interface unit 104 may receive location and/or movement information and/or include a location detection system 316 that is configured to determine a current location of the user interface unit and/or tracks movements of the user interface unit. The location detection system can provide relevant information in determining a location and/or an orientation of the user interface unit within the fulfillment center. In some instances, the location information may be utilized by the control circuit 302, the order fill management system 102, retrieval vehicle 112, and other such systems. In some embodiments, the location detection system may include a machine readable location code reader, global positioning satellite (GPS) detector, Wi-Fi signal triangulation and/or evaluation, cellular tower triangulation, accelerometers, gyroscopes, compass, light identifier detection system, and/or other such location detection functionality.

The user interface unit 104 may, in some implementations, further include one or more sensors 318. These sensors and/or the scanner systems 314, at least in part, can be used in determining location of the user interface unit, tracking movement of the user interface unit, determining and/or tracking an orientation of the user interface unit, obtain product and/or pallet identifying information (e.g., RFID tag reader, optical code reader (e.g., bar code reader), image capturing system, image and/or video processing system, text capture system, wireless communication node triangulation, beacon detection, other such systems, or combination of two or more of such systems), and the like. For example, in some embodiments, the user interface unit may include a distance measurement senor (e.g., laser distance measurement system) that can determine one or more distances between the user interface unit and one or more objects (e.g., a product), global positioning sensor system, accelerometer sensor, altimeter sensor, RFID tag reader, optical code reader, wireless signal triangulation sensor, beacon sensor, other such sensors, or combination of two or more of such sensors. The sensor data can continue to be obtained to detect changes over time (e.g., changes in distance between the user interface unit and one or more other objects), which can be used to track movement of the user interface unit.

In some embodiments, one or more retrieval vehicles 112 include a user interface unit and/or some or all of the components of the user interface units. For example, the retrieval vehicle may include one or more control circuits and memory storing code that when implemented one or more control circuits are configured to implement one or more of: control the movement of the retrieval vehicle, the retrieval of one or more pallets or products, the assembling of products on a full pull pallet, navigation through the fulfillment center, communication, and/or other such functionality. In some implementations, the retrieval vehicle includes one or more I/O interfaces, user interfaces 308, cameras, scanner systems, location detection systems (e.g., beacon detection, GPS, RFID reader, optical code reader, distance measuring, track distance traveled, accelerometer, etc.), sensor systems, other such components or combination of such components.

In some embodiments, the order fill management system 102 evaluates one or more product orders intended to be shipped to a particular shopping facility, and identifies how different products can be consolidated onto a full pull pallet of a product that is part of the one or more orders. A full pull pallet is a collection of a product that is cooperated into a single shipping configuration. Typically, the full pull pallet has a fixed number of the product that are stacked and organized so that the products can readily be transported while staying in their organized configuration. Further, a full pull pallet typically includes a base pallet or other support structure that supports the products stacked and organized onto the pallet. Still further, the base pallet is typically configured to allow a fork lift, pallet jack, or other such device to cooperate with and/or lift the full pull pallet, allowing the full pull pallet to be transported while the pallet supports the products and the organization of the products on the pallet is maintained.

Often, the dimensions of a full pull pallet are less than a height of a shipping vehicle. Accordingly, the shipment of a full pull pallet that is resting on the floor of the shipping vehicle may not extend to a ceiling or a threshold height within the vehicle. Thus, shipping space is often wasted. Some embodiments take advantage of this unused space by a full pull pallet and stack additional products that are less than a full pull pallet onto a full pull pallet. The resulting assembled pallet includes the full pull pallet of a first product, and one or more additional products stack on top of the full pull pallet of the first product. The additional products may be the first product, one or more different products, or a combination of such products. Typically, the assembled pallet has a height that is less than a threshold height, while additional products are stacked on top of the products of the full pallet. In some embodiments, the management control circuit 202 evaluates the enhanced case, at least in part, as a volume (e.g., cubic volume), which can include evaluating relative to one or more thresholds (e.g., height, width, depth, volume, etc.). Similarly, unused volume can be evaluated relative to dimensions of additional products. Some embodiments utilize one or more sensor systems 114 to scan an interior of an intended shipping vehicle, container or the like to determine threshold volumes. For example, one or more distance measurement systems (e.g., laser measurement systems) can be used to measure one or more dimensions of an interior of a cargo area of a transport vehicle, one or more dimensions of a door opening of a transport vehicle, images can be captured and evaluated to determine dimensions, and the like. Further, some embodiments continue to scan a cargo area of a vehicle as pallets, assembled pallets and/or other products are loaded into the delivery vehicle to determine one or more thresholds. Similarly, some embodiments track the weight of products placed into the delivery vehicle, and/or one or more weight sensors can be positioned to measure a weight of the vehicle and/or products as they are placed into the delivery vehicle. Still further, the sensor systems may include scanners to identify a delivery vehicle to confirm an assembled pallet is placed into a correct delivery vehicle.

The order fill management system is configured to identify, from the one or more orders from a shopping facility, a number of a particular product that would include at least a full pull pallet of that product. For example, a full pull pallet of bottled water may include 72 cases of bottled water. One or more orders from a particular shopping facility may request one or more full pull pallets of bottled water, or may request 175 cases of bottled water. Accordingly, the order fill management system can identify when one or more orders include a request for at least a full pull pallet of a particular product. The order full management system can then take advantage of the full pull pallet and define the full pull pallet as an enhanced case and/or utilize the full pull pallet as foundation upon which additional products can be placed and typically secured.

In some embodiments, one or more shipment orders are identified that are for multiple different products intended to be delivered to a retail shopping facility where the multiple different products are intended to be displayed and sold. At least one shipment order can comprise a request for at least a full pull pallet of a first product. Further, the orders can request items of multiple additional products, where the number of items of each of the multiple additional products ordered is less than a full pull pallet of that product.

The order fill management system can define the full pull pallet of the first product as an enhanced case of the first product. By defining the full pull pallet as an enhanced case, the order fill management system treats the full pull pallet the same as other products that are requested at less than a full pull pallet. Other systems in directing the collection of products typically directed the collection of a full pull pallet independent of products that are requested at less than a full pull pallet. As such, the orderfiller workers did not consolidate products with a full pull pallet as part of the product retrieval process. The present embodiments, however, define a full pull pallet as an enhanced case, and thus, the full pull pallet is treated the same as products requested at less than a full pull pallet. Further, the orderfiller worker retrieves the enhanced case in cooperation with retrieving products requested at less than a full pull pallet. In some embodiments, the retrieval vehicle and/or the orderfiller worker (e.g. using the user interface unit) confirms the correct enhanced case is retrieved, such as through a pallet bar code, a pallet RFID tag, image processing, and/or other such methods, prior to the enhanced case being pulled from a storage location. Some embodiments additionally or alternatively weigh an enhanced case as a confirmation that the correct enhanced case is retrieved.

Accordingly, in some embodiments, the enhanced cases are intended to be treated by an orderfiller worker, when collecting products to fulfill the one or more shipment orders, as less than a full pull pallet. The order fill management system is further configured to generate a pallet assembly list identifying the enhanced case of the first product and the items of at least a plurality of the multiple additional products. The pallet assembly list is communicated via the computer and/or communication network to a user interface unit associated with an orderfiller worker to be accessible by the orderfiller worker. The assembly list comprises a listing of products and directs the orderfiller worker to travel through at least part of the fulfillment center to retrieve and cooperate the enhanced case of the first product and the plurality of the multiple additional products as a single assembled pallet. In some applications, the assembly list is generated to specify the enhanced case of the first product as a first item to be retrieved by the first orderfiller worker and/or the retrieval vehicle, and intending the enhanced case be used as a base of the single assembled pallet, that includes the full pull pallet and one or more, and typically, multiple additional products stacked on top of the full pull pallet. Some embodiments further simplify the assembly of an assembled pallet by reducing the number of workers in assembling an assembled pallet and/or implement some or all of the retrieval and/or assembly through automated systems and/or retrieval vehicles. Further, in many implementations, full pull pallets do not have to be pulled and temporarily placed at a staging area, while other products are collected then brought to the staging area where one or more other workers may be responsible for cooperating products with full pull pallets, and thus simplifying the pallet and product assembly process.

In some embodiments, the order fill management system evaluates dimensions of the enhanced case and/or additional products in identifying which are to be assembled with the enhanced case. One or more sensor systems 114 may further be used to determine and/or confirm dimensions of an enhanced case and/or one or more products. For example, laser measurement systems, cameras and image processing systems, and/or other such sensor systems can be employed to determine and/or confirm dimensions. Typically, the product fulfillment center inventory system accesses one or more memory (e.g., databases 110) to retrieve dimensions data that can be used to confirm an identification of an enhanced case and/or products, determine assembly, confirm accurate assembly, and/or confirm assembly does not exceed one or more thresholds.

Figure 4:
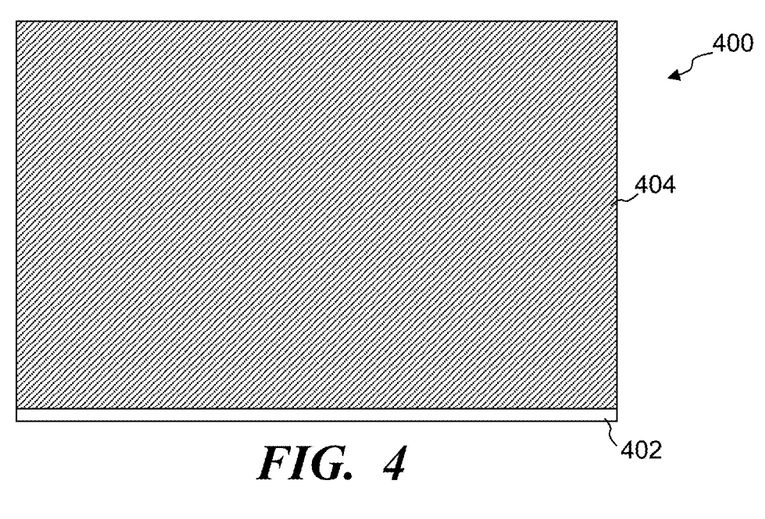
FIG. 4 illustrates a simplified block diagram of an exemplary enhanced case, with a base pallet and one or more of the first product positioned and organized on the base pallet, in accordance with some embodiments.

FIG. 4 illustrates a simplified block diagram of an exemplary enhanced case 400, with a base pallet 402 and one or more of the first product 404 positioned and organized on the base pallet, in accordance with some embodiments. The control circuit 202 can, in generating the pallet assembly list, identify dimensions of the enhanced case of the first product (e.g., width, length, height), and dimensions of each item of multiple additional products being ordered that may be cooperated with the enhanced case 400. Again, the dimensions may be accessed from a product supplier, determined when received at the product fulfillment center, and/or detected using one or more sensor systems. The order fill management system 102 can evaluate the dimensions and select one or more of the additional products, which is often less than all of the multiple additional products ordered by the shopping facility, to be collected and assembled with the enhanced case 400 as a function of the dimensions of the enhanced case and the dimensions of the plurality of the multiple additional products.

As introduced above, in some instances the order fill management system considers one or more height thresholds, width thresholds, length thresholds, weight thresholds and/or other such thresholds in selecting additional products to be assembled with the enhanced case 400. For example, in many instances, the enhanced case 400 (e.g., with the base pallet 402 and the first products 404) may have a height that is less than a threshold height, which may be defined by a delivery vehicle, doors, and/or other such factors.

Figure 5:
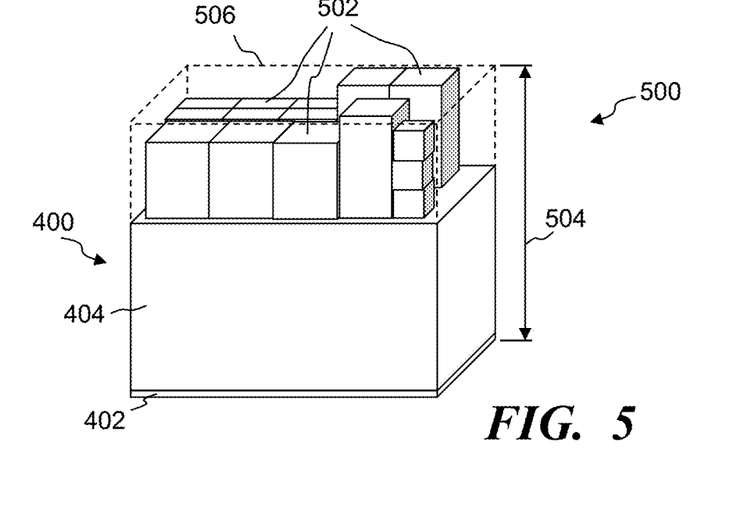
FIG. 5 illustrates a simplified block diagram of the exemplary assembled pallet with an enhanced case cooperated with additional products, in accordance with some embodiments.

FIG. 5 illustrates a simplified block diagram of the exemplary assembled pallet 500 with an enhanced case 400 cooperated with additional products 502, in accordance with some embodiments. Accordingly, in some implementations, the management control circuit 202, in selecting the plurality of additional products, selects the plurality of additional products based on a determination that a resulting height, volume and/or weight of the assembled pallet will be less than a threshold height 504, threshold weight, and/or threshold volume 506. Using the dimensions of the enhanced case 400 relative to the threshold height 504 and/or threshold volume 506, the control circuit can determine an available volume that can be occupied by one or more of the additional products. Further, in some embodiments, the control circuit evaluates the dimensions of the potential additional products relative to the available volume and identifies additional products 502 that can be cooperated with the enhanced case 400 and maintain one or more thresholds, and may further identify additional products that should not be cooperated into the enhanced case. Further, in some embodiments, one or more weight sensors are used to confirm a weight of one or more of the enhanced case 400, one or more additional products, and the assembled pallet. In some instances, for example the retrieval vehicle and/or trailer can include one or more weight sensors, the base pallet 402 may include one or more weight sensors, the retrieval vehicle and/or trailer may be positioned on one or more weight sensors, an automated retrieval system of the retrieval vehicle (e.g., one or more robotic arms, cranes, forklifts, etc.) may include one or more weight sensors (e.g., detecting weight of an enhanced case lifted by an automated forklift system of the retrieval vehicle, a weight sensor of a lift arm that retrieves individual products to be cooperated into an enhanced pallet, etc.).

In some embodiments, the control circuit further evaluates the dimensions of the ordered additional products relative to the available volume and determines an orientation of some or all of the additional products that are to be cooperated with the enhanced case and/or other additional products. Accordingly, the management control circuit 202 can further identify a stacking sequence based at least in part on dimensions of the plurality of the additional products 502 to be collected. The stacking sequence can define an order and orientation of how each of the plurality of additional products are to be stacked and cooperated with the enhanced case. The stacking sequence can be communicated to a user interface unit associated with an orderfiller worker tasked to cooperate the products to produce the assembled pallet 500.

In some embodiments, the management control circuit further obtains graphical imagery of each of the enhanced case 400, and the additional products. Further, the graphical imagery may provide two-dimensional and/or three-dimensional imagery. Using the graphical imagery, the control circuit can generate graphical imagery illustrating the order and the orientation of how each of the plurality of additional products 502 are to be stacked and cooperated with the enhanced case. The graphical imagery can be communicated to the user interface unit associated with the orderfiller worker to enable the user interface unit to display the graphical imagery in directing the orderfiller worker in how the plurality of additional products are to be cooperated with the enhanced case. In some instances, the graphical imagery may include animated sequences that demonstrate how and where the additional products are to be oriented.

In some embodiments, the management control circuit further considers other factors in determining the stacking sequence, such as but not limited to weight, packaging material, type of product, temperature of product, frangibility of a product, capability to support weight of other products, dimensions of products, shape of packaging, gaps and/or soft spots of packaging, orientation needs and/or preferences (e.g., "this end up"), other such factors, and typically a combination of two or more of such factors. Some embodiments maintain a product profile of one or more products, a case profile of one or more products, full pull pallet profile of one or more products, and/or other such profiles, that can include one or more of the above identified factors and/or other such factors. The management control circuit can further consider one or more of these profiles in determining whether additional products are to be cooperated with a full pull pallet, and how those additional products should be cooperated when generating a stacking sequence. In some implementations, the management control circuit accesses a product profile corresponding to each of the multiple additional products and/or the enhanced case. Again, the product profile of each of the multiple additional products and/or the enhanced case can define one or more factors such as but not limited to the dimensions, rigidity, rate of compression and/or weights corresponding to degree of compression, compression thresholds, and a frangibility score of each of the multiple additional products and/or the enhanced case. The frangibility score can be determined based on an ability of the product to support the weight of another product, a product load distribution factor, type of deformation that might occur, whether deformation is likely to recover, type of damage that may occur, and/or other such factors. Using the profile information (e.g., dimensions, frangibility score, etc.), the management control circuit can select the plurality of the additional products, and typically less than all of the multiple additional products ordered by the shopping facility, to be collected and assembled with the enhanced case as a function of the product profile of each the plurality of the multiple additional products. In some instances, the management control circuit can determine available volume of the assembled pallet, and based on dimensions of additional products that potentially could be cooperated and determine various potential stackings of additional products. The stackings can be evaluated relative to one or more other thresholds, such as frangibility threshold, compression threshold, rigidity, weight and other such thresholds. Based on the thresholds, one or more of the stackings can be excluded (e.g., product A could not be placed under product B). Remaining one or more stackings can be evaluated relative to one or more parameters (e.g., priority of getting one or more additional product shipped, quantities of additional products incorporated in to an assembled pallet, whether one or more other assembled pallets are also being configured for the same retail facility, other such parameters, and often a combination of two or more of such factors). For example, the management control circuit can identify a maximum number of the additional products that can be assembled onto the enhanced case.

As introduced above, the enhanced case may further have a profile that provides one or more of the factors. One such factor may include an indication of an ability for an enhanced case to operate as a base for one or more additional products, a threshold weight that the enhanced case can support, a weight distribution criteria (e.g., amount of weight per specified area), and/or other such factors. The management control circuit can, in generating the pallet assembly list, further identify that the full pull pallet of the first product can be utilized as a base for less than a threshold weight. Based on the threshold weight, the management control circuit can select the plurality of the additional products as a function of a weight of each of the plurality of additional products and the threshold weight. Similarly, the management control circuit may determine a threshold weight distribution and evaluate the relative size of an additional product relative to its weight in determining whether the product complies with the threshold weight distribution.

In some instances, the management control circuit may further specify that an intermediate base be placed on top of the enhanced case and/or on top of one or more products placed on the enhanced case. The intermediate base can be utilized to establish a more rigid surface upon which additional products can be placed, further distribute the weight and/or other such factors. Further, the intermediate base may be configured to extend across an entire area of an enhanced case, while in other instances, the intermediate base may extend over only a percentage of the area of the enhanced case. In some instances, the cumulative intermediate base may be formed through the cooperation of multiple intermediate based positioned adjacent to each other and/or interconnected. The intermediate base may be formed from substantially any relevant material, such as but not limited to cardboard, paper, plastic, wood, other such material, or combination of two or more of such materials. Further, the intermediate base may include gaps, spaces, separators or the like that can provide the desired support while otherwise reducing a weight of the intermediate base. For example, a wood pallet may be placed on top of an enhanced case with the additional products placed on top of the intermediate base wood pallet. The management control circuit can take dimensions, weight and/or other factors (e.g., weight that can be supported, etc.) of the intermediate base into consideration when selecting additional products relative to one or more threshold. In some instances, an intermediate base may further be used as a top to an assembled pallet. This may be use, for example, when the assembled pallet is transported in an open truck, rail car or the like, where wind may affect the stability of the assembled pallet. Further, straps and/or other such methods can be used to secure the assembled pallet, and when an intermediate base is used as a top, the straps are less likely to damage products while allowing a threshold pressure to be applied with the straps.

As introduced above, in some embodiments, the order fill management system may further provide route instructions that the orderfiller worker and/or autonomous retrieval vehicle is to follow in collecting the enhanced case 400 and additional products 502 to be cooperated with the enhanced case and/or another enhanced case. In some instances, the orderfiller workers drive a retrieval vehicle 112 that includes an area where products can be placed and/or is cooperated with a trailer or multiple trailers upon which one or more enhanced cases and/or additional products can be placed while collecting products and/or while additional products are stacked on the one or more enhanced cases. In other instances, the routing directs the autonomous retrieval vehicle through the fulfillment center (e.g., using identifiers (e.g., bar codes, encoded route lines, etc.) in the floor, on racks, location encoded information emitted from light sources, GPS, wireless signal triangulation, etc.). The routing can attempt to reduce and/or optimize time in collecting the products, while in other instances, the route may be based at least in part on how additional products are to be stacked. Typically, however, the routing takes into consideration the location of the retrieval vehicle, and the location of the products to be acquired relative to other products to be retrieved and cooperated into an enhanced pallet. Some embodiments may, however, determine routing based at least in part on the stacking sequence and/or the size and/or weight of products to be stacked.

Often, the products are collected in an order that does not correspond to the stack sequence, for example because the collection sequence is based on product location within the fulfillment center (e.g., products positioned on a sale aisle will be sequentially collected even though they are not sequentially stacked). Accordingly, the products can be temporarily placed on the retrieval vehicle and/or trailer as the orderfiller worker and/or autonomous retrieval vehicle collects products. The order fill management system can track a location of the user interface unit associated with the worker, the retrieval vehicle (e.g., based on location information communicated from the retrieval vehicle and/or communications of sensor information from the one or more sensor systems 114, such as RFID, Wi-Fi, triangulation, beacon detection, etc.), retrieved products (e.g., scanning product identifiers), and the like, and distribute some or all of the stacking sequence based on products collected. In other instances, the stacking sequence is not implemented until many if not all of the additional products are collected. This can avoid additional products falling off the enhanced case because they are not adequately secured with the enhanced case while the worker continues to collect additional products. The stacking sequence may further provide instructions regarding how the worker and/or the autonomous retrieval vehicle is to secure one or more additional products, such as using one or more intermediate bases, direction and number of rotations of plastic wrap and/or shrink wrap around the enhanced case and additional products, number of ties that are to be extended over additional products, and/or other such methods of securing the additional products.

Figure 6:
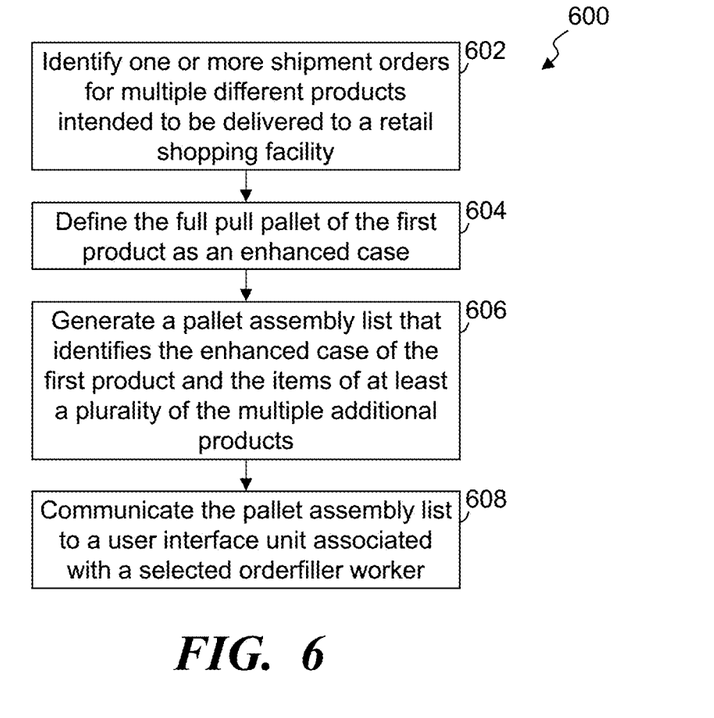
FIG. 6 illustrates a simplified flow diagram of an exemplary process of consolidating additional products onto a full pull pallet to provide an assembled pallet, in accordance with some embodiments.

FIG. 6 illustrates a simplified flow diagram of an exemplary process 600 of consolidating additional products onto a full pull pallet to provide an assembled pallet, in accordance with some embodiments. In some implementations, the process 600 directs the consolidation of products in fulfilling at least part of one or more product orders for a retail shopping facility. Again, typically a retail shopping facility may submit one or more orders for multiple different products. The process 600 can collect at least some products that are less than a full pull pallet and cooperate those additional products with one or more full pull pallets. In step 602, at least one shipment order for multiple different products intended to be delivered to a retail shopping facility are identified through an order fill management system associated with a product fulfillment center. The multiple different products are intended to be displayed and sold at the retail shopping facility. In some instances, the shipment order or orders comprise a request for at least a full pull pallet of a first product, and a request for items of multiple additional products wherein the number of items of each of the multiple additional products ordered is less than a full pull pallet of that product. Accordingly, the control circuit can be configured to identify when one or more full pull pallets of a product is or can be included in the shipment.

In step 604, the full pull pallet of the first product is defined as an enhanced case of the first product such that the enhanced case is intended to be treated by an orderfiller worker and/or autonomous retrieval vehicle, when collecting products to fulfill the shipment order or orders, as less than a full pull pallet. In step 606, a pallet assembly list is generated that identifies the enhanced case of the first product and the items of at least a plurality of the multiple additional products that are to be cooperated with the enhanced case in forming the single assembled pallet. Typically, in generating the pallet assembly list, the pallet assembly list specifies the enhanced case of the first product to be retrieved by the first orderfiller worker or autonomous retrieval vehicle intending that the enhanced case be used as a base of the single assembled pallet. In step 608, the pallet assembly list is communicated to a user interface unit associated with a selected orderfiller worker to be accessible by the orderfiller worker and directing the orderfiller worker to travel through at least part of the fulfillment center to retrieve and cooperate the enhanced case of the first product and the one or more additional products as a single assembled pallet. In some embodiments, the pallet assembly list and routing information is communicated to an autonomous retrieval vehicle.

Typically, the pallet assembly list specifies the enhanced case of the first product to be retrieved by the first orderfiller worker or autonomous retrieval vehicle intending that the enhanced case be used as a base of the single assembled pallet. The control circuit further evaluates a profile and/or other information corresponding to the full pull pallet in confirming that the full pull pallet can be used as a base, and whether and in what quantities one or more additional products can be stacked on the full pull pallet. Some embodiments, in generating the pallet assembly list identify that the full pull pallet of the first product can be utilized as a base for less than a threshold weight. The plurality of the additional products can be selected as a function of a weight of each of the plurality of additional products and the threshold weight. Similarly, some embodiments consider dimensions of the full pull pallet relative to one or more dimension thresholds. For example, a height and/or volume of the enhanced case can be considered relative to a height threshold and/or volume threshold to determine whether one or more additional products can be added, and dimensions of additional products in identifying which of the additional products may be added to the enhanced case.

Some embodiments, in generating the pallet assembly list further identify dimensions of the enhanced case of the first product and each item of the multiple additional products. The plurality of the additional products can be selected, and often less than all of the multiple additional products, to be collected and assembled with the enhanced case as a function of the dimensions of the enhanced case and the dimensions of the plurality of the multiple additional products. Again, the selection of the plurality of additional products can be limited based on a threshold dimension. Some implementations, for example, select the plurality of additional products based on a determination that a resulting height of the assembled pallet will be less than a threshold height. In some instances, the threshold height may be determined based on distance measurements from one or more sensor systems 114 within a delivery vehicle.

The control circuit, in some embodiments, can further provide the worker and/or autonomous retrieval vehicle and/or autonomous stacking system with guidance regarding the cooperation of the additional products with the enhanced case. The stacking sequence can be generated and/or identified, for example, based on dimensions of the plurality of the additional products to be collected, weights of additional products, weight thresholds, volume and/or height thresholds, frangibility thresholds, compressibility factors, compressibility thresholds, other such factors, or combination of such factors. The stacking sequence can be configured to define an order and/or orientation of how each of the plurality of additional products are to be stacked and cooperated with the enhanced case. The stacking sequence can be communicated to the user interface unit associated with the orderfiller worker and/or retrieval vehicle, and through the user interface unit the worker can see and/or hear the stacking sequence that the worker can follow, or that an autonomous system is to follow. The user interface unit may be carried by the worker, mounted on a retrieval vehicle or trailer, mounted on a shelving unit or other fixed position and activated based on knowledge of the workers location and/or expected location (e.g., based on product instructed to retrieve), or other such user interface unit.

In some embodiments, the control circuit can obtain graphical imagery that illustrates the order and/or the orientation of how each of the plurality of additional products are to be stacked and cooperated with the enhanced case. The graphical imagery can be communicated to the user interface unit to enable the user interface unit to display the graphical imagery in directing the orderfiller worker in how the plurality of additional products are to be cooperated with the enhanced case. The graphical imagery can be communicated as part of the pallet assembly list, separate from the pallet assembly list (e.g., in response to a request from the worker through the user interface unit), or the like.

As introduced above, some embodiments consider pallet information and/or a profile, and/or product information and/or profile in determine products to cooperate with a full pull pallet, and in some instances, the orientation and order of cooperation. Some embodiments access a product profile corresponding to each of the multiple additional products. The product profile of each of the multiple additional products can define, for example, the dimensions of the product, weight of a product, a frangibility score of a product, a weight capacity that a product can support, packaging material information, information about variations in the packaging, information about soft or more flexible areas of a package, other such information, or a combination of two or more of such information.

The control circuit can select the plurality of the additional products, and typically less than all of the multiple additional products ordered, to be collected and assembled with the enhanced case as a function of the product profile of each the plurality of the multiple additional products. Similarly, the control circuit can access and consider an enhanced case profile corresponding to the full pull pallet in selecting which additional products, quantities of additional products and/or their orientation in cooperating with the enhanced case. The enhanced case profile can define, for example, the dimensions of the enhanced case, weight of the enhanced case, a frangibility score of the enhanced case, a weight capacity that the enhanced case can support, packaging material information of the enhanced case and/or products of the enhanced case, information about variations in the packaging, information about soft or more flexible areas of the enhanced case and/or a package of the products in the enhanced case, other such information, or a combination of two or more of such information. In some embodiments, the profiles of some or all of the full pull pallets and/or products can include a stackability score that corresponds to the relative easy that the product can stack and/or upon which other products can be placed. The stackability score may further take into consideration weight, volume, weight that can be supported per unit area, whether the product is liquid, density, durability, frangibility, other such factors, or combination of two or more of such factors.

In some embodiments, systems, apparatuses and methods are provided to direct the consolidation of products in fulfilling a product order for a retail shopping facility. In some embodiments, a system comprises: a plurality of mobile user interface units comprising wireless transceivers, a control circuit, and a user interface; an order fill management system associated with a product fulfillment center comprising a transceiver, a management control circuit and memory storing computer instructions that when executed by the management control circuit cause the management control circuit to: identify at least one shipment order for multiple different products intended to be delivered to a retail shopping facility where the multiple different products are intended to be displayed and sold, wherein the at least one shipment order comprises a request for at least a full pull pallet of a first product, and a request for items of multiple additional products wherein the number of items of each of the multiple additional products ordered is less than a full pull pallet of that product; define the full pull pallet of the first product as an enhanced case of the first product such that the enhanced case is intended to be treated by an orderfiller worker, when collecting products to fulfill the at least one shipment order, as less than a full pull pallet; generate a pallet assembly list identifying the enhanced case of the first product and the items of at least a plurality of the multiple additional products; and communicate the pallet assembly list to a first user interface unit associated with a first orderfiller worker to be accessible by the first orderfiller worker and directing the first orderfiller worker to travel through at least part of the fulfillment center to retrieve and cooperate the enhanced case of the first product and the plurality of the multiple additional products as a single assembled pallet.

Some embodiments provide methods to direct the consolidation of products in fulfilling a product order for a retail shopping facility, comprising: by a control circuit: identifying, through an order fill management system associated with a product fulfillment center, at least one shipment order for multiple different products intended to be delivered to a retail shopping facility wherein the multiple different products are intended to be displayed and sold, wherein the at least one shipment order comprises a request for at least a full pull pallet of a first product, and a request for items of multiple additional products wherein the number of items of each of the multiple additional products ordered is less than a full pull pallet of that product; defining the full pull pallet of the first product as an enhanced case of the first product such that the enhanced case is intended to be treated by an orderfiller worker, when collecting products to fulfill the at least one shipment order, as less than a full pull pallet; generating a pallet assembly list identifying the enhanced case of the first product and the items of at least a plurality of the multiple additional products; and communicating the pallet assembly list to a first user interface unit associated with a first orderfiller worker to be accessible by the first orderfiller worker and directing the first orderfiller worker to travel through at least part of the fulfillment center to retrieve and cooperate the enhanced case of the first product and the plurality of the multiple additional products as a single assembled pallet.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to direct the consolidation of products in fulfilling a product order for a retail shopping facility, comprising:
   a plurality of mobile user interface units comprising wireless transceivers, a control circuit, and a user interface, wherein each of the plurality of mobile user interface units are associated with a respective one of a plurality of orderfiller workers;
   an order fill management system associated with a product fulfillment center comprising a transceiver, a management control circuit and memory storing computer instructions that when executed by the management control circuit cause the management control circuit to:
      identify at least one shipment order for multiple different products intended to be delivered to a first retail shopping facility where the multiple different products are intended to be displayed and sold, wherein the at least one shipment order comprises a request for at least a full pull pallet of a first product, and a request for items of multiple additional products wherein the number of items of each of the multiple additional products ordered is less than a full pull pallet of that product;
      define the full pull pallet of the first product as an enhanced case of the first product such that the enhanced case is intended to be treated by an orderfiller worker, when collecting products to fulfill the at least one shipment order, as less than a full pull pallet;
      generate a pallet assembly list identifying the enhanced case of the first product and the items of at least a plurality of the multiple additional products; and
      communicate the pallet assembly list to a first user interface unit, of the plurality of mobile user interface units, that is associated with a first orderfiller worker to be accessible by the first orderfiller worker through the first user interface unit, and directing the first orderfiller worker to travel through at least part of the fulfillment center and have the first orderfiller worker retrieve and cooperate the enhanced case of the first product and the plurality of the multiple additional products as a single assembled pallet.

2. The system of claim 1, wherein the management control circuit in generating the pallet assembly list, generates the pallet assembly list specifying the enhanced case of the first product as a first item to be retrieved by the first orderfiller worker intending the enhanced case be used as a base of the single assembled pallet.

3. The system of claim 1, wherein the management control circuit in generating the pallet assembly list further identifies dimensions of the enhanced case of the first product and each item of the multiple additional products and selects the plurality of the additional products, and less than all of the multiple additional products, to be collected and assembled with the enhanced case as a function of the dimensions of the enhanced case and the dimensions of the plurality of the multiple additional products.

4. The system of claim 3, wherein the management control circuit in selecting the plurality of additional products selects the plurality of additional products based on a determination that a resulting volume of the assembled pallet will be less than a threshold volume.

5. The system of claim 1, wherein the management control circuit is further configured to identify a stacking sequence based on dimensions of the plurality of the additional products to be collected, wherein the stacking sequence defines an order and orientation of how each of the plurality of additional products are to be stacked and cooperated with the enhanced case, and communicates the stacking sequence to the first user interface unit associated with the first orderfiller worker.

6. The system of claim 5, wherein the management control circuit further obtains graphical imagery illustrating the order and the orientation of how each of the plurality of additional products are to be stacked and cooperated with the enhanced case, and communicates the graphical imagery and animated sequences to the first user interface unit to enable the first user interface unit to display the graphical imagery in directing the first orderfiller worker in how the plurality of additional products are to be cooperated with the enhanced case and cause the first user interface unit to display the animated sequences showing how and where each of the plurality of additional products are to be oriented on the enhanced case.

7. The system of claim 5, wherein the management control circuit is further configured to:

access a product profile corresponding to each of the multiple additional products, wherein the product profile of each of the multiple additional products defines the dimensions and a frangibility score of each of the multiple additional products, a weight capacity that a respective additional product can support, a product load distribution factor, a type of deformation to occur to the respective additional product, and one or more flexible areas of packaging of the respective additional product; and selects the plurality of the additional products, and less than all of the multiple additional products, to be collected and assembled with the enhanced case and determines the stacking sequence as a function of the product profile of each of the plurality of the multiple additional products including the dimensions of respective additional product, a frangibility score of the respective additional product, the weight capacity that the respective additional product can support, the product load distribution factor, the type of deformation to occur to the respective additional product, and the one or more flexible areas of packaging of the respective additional product.

8. The system of claim 1, wherein the management control circuit in generating the pallet assembly list is further configured to identify that the full pull pallet of the first product can be utilized as a base for less than a threshold weight, and selects the plurality of the additional products as a function of a weight of each of the plurality of additional products and the threshold weight.

9. A method to direct the consolidation of products in fulfilling a product order for a retail shopping facility, comprising:

by a control circuit:
identifying, through an order fill management system associated with a product fulfillment center, at least one shipment order for multiple different products intended to be delivered to a retail shopping facility wherein the multiple different products are intended to be displayed and sold, wherein the at least one shipment order comprises a request for at least a full pull pallet of a first product, and a request for items of multiple additional products wherein the number of items of each of the multiple additional products ordered is less than a full pull pallet of that product;

defining the full pull pallet of the first product as an enhanced case of the first product such that the enhanced case is intended to be treated by an orderfiller worker, when collecting products to fulfill the at least one shipment order, as less than a full pull pallet;

generating a pallet assembly list identifying the enhanced case of the first product and the items of at least a plurality of the multiple additional products; and communicating the pallet assembly list to a first user interface unit associated with a first orderfiller worker to be accessible, through the first user interface unit, by the first orderfiller worker and directing the first orderfiller worker through the first user interface unit to travel through at least part of the fulfillment center and have the first orderfiller worker retrieve and cooperate the enhanced case of the first product and the plurality of the multiple additional products as a single assembled pallet.

10. The method of claim 9, wherein the generating the pallet assembly list comprises generating the pallet assembly list specifying the enhanced case of the first product to be retrieved by the first orderfiller worker intending the enhanced case be used as a base of the single assembled pallet.

11. The method of claim 9, wherein the generating the pallet assembly list further comprises:
identifying dimensions of the enhanced case of the first product and each item of the multiple additional products; and
selecting the plurality of the additional products, and less than all of the multiple additional products, to be collected and assembled with the enhanced case as a function of the dimensions of the enhanced case and the dimensions of the plurality of the multiple additional products.

12. The method of claim 11, wherein the selecting the plurality of additional products comprises selecting the plurality of additional products based on a determination that a resulting volume of the assembled pallet will be less than a threshold volume.

13. The method of claim 9, further comprising:
identifying a stacking sequence based on dimensions of the plurality of the additional products to be collected, wherein the stacking sequence defines an order and orientation of how each of the plurality of additional products are to be stacked and cooperated with the enhanced case; and
communicating the stacking sequence to the first user interface unit associated with the first orderfiller worker.

14. The method of claim 13, further comprising:
obtaining graphical imagery and animated sequences configured to illustrate the order and the orientation of how each of the plurality of additional products are to be stacked and cooperated with the enhanced case; and
communicating the graphical imagery and the animated sequences to the first user interface unit to enable the first user interface unit to display the graphical imagery in directing the first orderfiller worker in how the plurality of additional products are to be cooperated with the enhanced case and cause the first user interface unit to display the animated sequences showing how and where each of the plurality of additional products are to be oriented on the enhanced case.

15. The method of claim 13, further comprising:
accessing a product profile corresponding to each of the multiple additional products, wherein the product profile of each of the multiple additional products defines the dimensions and a frangibility score of each of the multiple additional products, a weight capacity that a respective additional product can support, a product load distribution factor, a type of deformation to occur to the respective additional product, and one or more flexible areas of packaging of the respective additional product; and selecting the plurality of the additional products, and less than all of the multiple additional products, to be collected and assembled with the enhanced case and determining the stacking sequence as a function of the product profile of each of the plurality of the multiple additional products including the dimensions of respective additional product, a frangibility score of the respective additional product, the weight capacity that the respective additional product can support, the product load distribution factor, the type of deformation to occur to the respective additional product, and the one or more flexible areas of packaging of the respective additional product.

16. The method of claim 9, wherein the generating the pallet assembly list further comprises identifying that the full pull pallet of the first product can be utilized as a base for less than a threshold weight, and selecting the plurality of the additional products as a function of a weight of each of the plurality of additional products and the threshold weight.

17. The system of claim 5, wherein the management control circuit, in determining the stacking sequence, is further configured to:
   obtain a current total volume of the enhanced case and any of the multiple additional products previously added to the enhanced case when one or more of the multiple additional products were previously added;
   obtain a threshold volume and a height threshold of a completed assembled pallet;
   determine an available volume of the assembled pallet based on the current total volume relative to the volume threshold;
   obtain dimensions of each of the multiple additional products ordered by and intended to be delivered to the first retail shopping facility, and a quantity of each of the multiple additional products that potentially could be cooperated with the enhanced case;
   determine various different potential stackings of at least a subset of the multiple additional products;
   evaluate each of the potential stackings relative to multiple thresholds comprising at least the threshold volume, the height threshold, a frangibility threshold relative to each of the subset of the multiple additional products, a compression threshold relative to each of the subset of the multiple additional products, and a capability of each of the subset of the multiple additional products to support weight of one or more other products of the multiple additional products;
   identify, on the evaluation of the potential stackings to the multiple thresholds, one or more of the potential stackings can be excluded providing a remaining one or more potential stackings; and
   evaluate the remaining one or more potential stackings relative to priorities of the multiple additional products and quantities of additional products incorporated in to the respective remaining one or more potential stackings, and selecting one of the remaining one or more potential stackings and generating the stacking sequence for the selected one of the remaining one or more potential stackings.

18. The system of claim 1, wherein the management control circuit is further configured to evaluate, for the full pull pallet of the first product, a threshold weight that the full pull pallet can support and a weight distribution threshold per specified area that the full pull pallet can support;
   confirm that the full pull pallet of the first product is capable of be utilized as a base for less than an base threshold weight;
   evaluate, when the full pull pallet of the first product is capable of be utilized as the base, the multiple additional products relative to a function of a weight of each of the multiple additional products and the base threshold weight and relative to a size and the weight of each of the multiple additional products based on the weight distribution threshold; and
   select the plurality of the additional products as a function of the weight of each of the multiple additional products relative to the base threshold weight and the size and the weight of each of the multiple additional products relative to the weight distribution threshold.

19. The system of claim 18, wherein the management control circuit is further configured to provide directions to the orderfiller worker regarding a direction of and a number of rotations of a wrap this to be applied around at least a portion of the enhanced case and the plurality of the multiple additional products, and provide directions to the orderfiller worker regarding a number of ties that are to be cooperated with the single assembled pallet.

20. The system of claim 18, wherein the management control circuit is further configured to specify in a stacking sequence instructions that one or more intermediate bases are to be placed on top of the enhanced case extending across respective areas of the top of the enhanced case establishing a more rigid surface upon which the plurality of the multiple additional products are to be placed.

* * * * *

UNITED STATES PATENT AND TRADEMARK OFFICE
CERTIFICATE OF CORRECTION

| | |
|---|---|
| PATENT NO. | : 10,535,040 B2 |
| APPLICATION NO. | : 15/471297 |
| DATED | : January 14, 2020 |
| INVENTOR(S) | : Andrew J. Rizkalla |

It is certified that error appears in the above-identified patent and that said Letters Patent is hereby corrected as shown below:

In the Claims

Column 21, Line 42, Claim 17, delete "in to" and insert --into--.

Signed and Sealed this
Twenty-sixth Day of May, 2020

Andrei Iancu
*Director of the United States Patent and Trademark Office*